Oct. 12, 1943.   R. M. NELSON   2,331,620
DRAFT GEAR
Filed Oct. 3, 1941
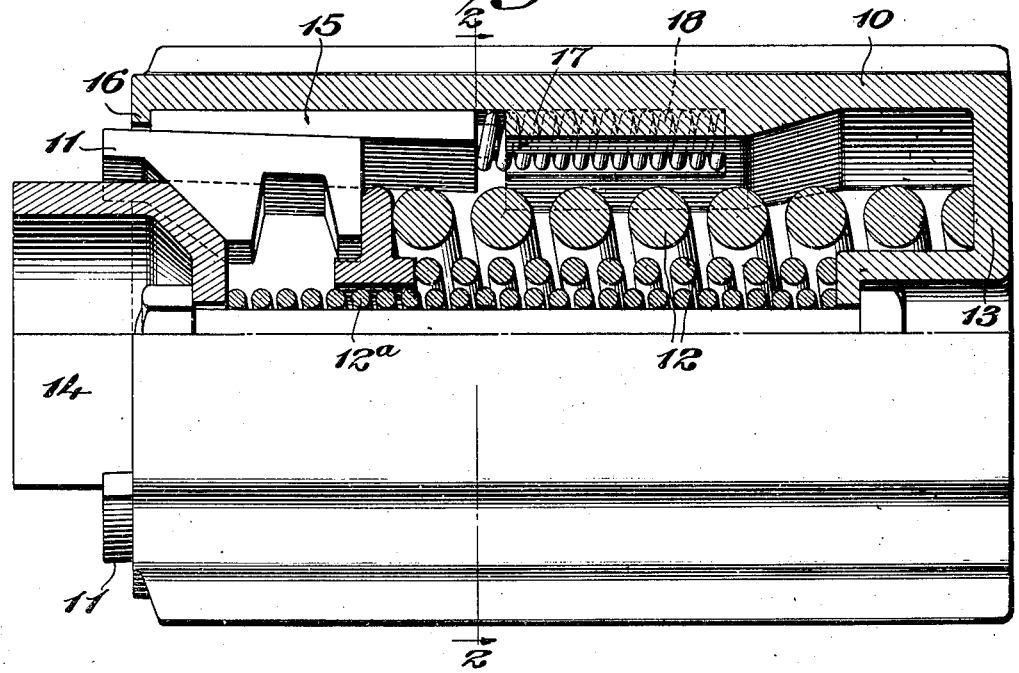
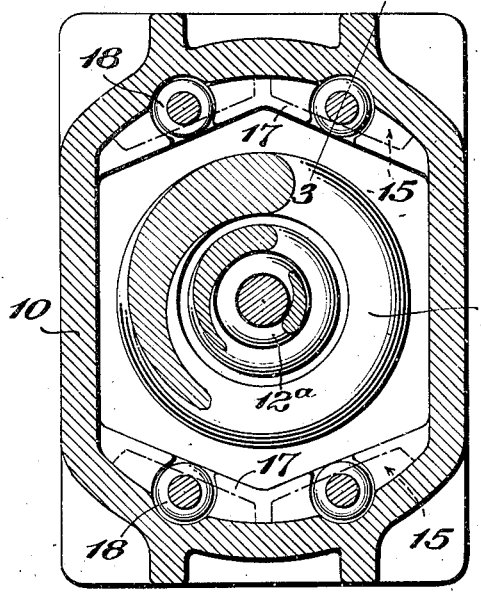
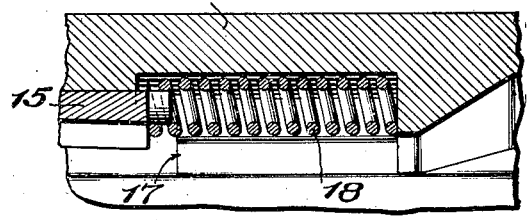
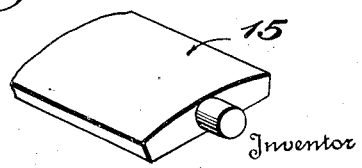
Inventor
Robert M. Nelson,
By D. P. Wolhaupter
Attorney Oct. 12, 1943.  R. M. NELSON  2,331,620
DRAFT GEAR
Filed Oct. 3, 1941   2 Sheets-Sheet 2

Inventor
Robert M. Nelson,
By D. P. Wolhaupter
Attorney

Patented Oct. 12, 1943

2,331,620

UNITED STATES PATENT OFFICE 2,331,620

DRAFT GEAR

Robert M. Nelson, Evanston, Ill., assignor to Peerless Equipment Company, Chicago, Ill., a corporation of Delaware Application October 3, 1941, Serial No. 413,548

2 Claims. (Cl. 213—24)

This invention relates to railway draft gears of the general type comprising a casing, friction shoes therein, resilient means reacting from the casing forwardly upon said fraction shoes, and a wedge element for exerting force rearwardly and outwardly upon said fraction shoes in response to draft and buffing forces imposed on the gear to cause said shoes to frictionally resist said forces.

In draft gears of the general type mentioned it is desirable to provide means to prevent sticking of the friction shoes in rearwardly disposed positions after release of draft or buffing forces imposed on the gear, as in that event the gear is ineffective to absorb shocks incident to subsequent draft or buffing forces imposed thereon and if the friction shoes are jarred loose, as usually happens, the gear suddenly expands with a very undesirable hammer-like action. Also, it is desirable in such gears to provide for initial substantially free rearward movement of the friction shoes relative to the casing resisted only by the resilient means exerting force forwardly upon the friction shoes in order to avoid sudden and harsh absorption of draft and buffing forces imposed on the gear and to cause the gear to absorb such forces gradually and smoothly. Accordingly, the general object of the present invention is to provide a draft gear of the type mentioned embodying simple, practical means to insure against sticking of the friction shoes in rearwardly disposed positions and to permit substantially free initial rearward movement of the friction shoes resisted only by the resilient means which exerts force forwardly against said shoes.

With the foregoing and other objects in view, which will become more fully apparent as the nature of the invention is better understood, the same consists in a draft gear of the general type mentioned embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a central, vertical, longitudinal section through a draft gear constructed in accordance with one practical embodiment of the invention.

Figure 2 is a cross section on the line 2—2 of Fig. 1.

Figure 3 is a fragmentary, longitudinal section on the line 3—3 of Fig. 2.

Figure 4 is a perspective view of the rear end portion of one of the liners.

Figure 5:
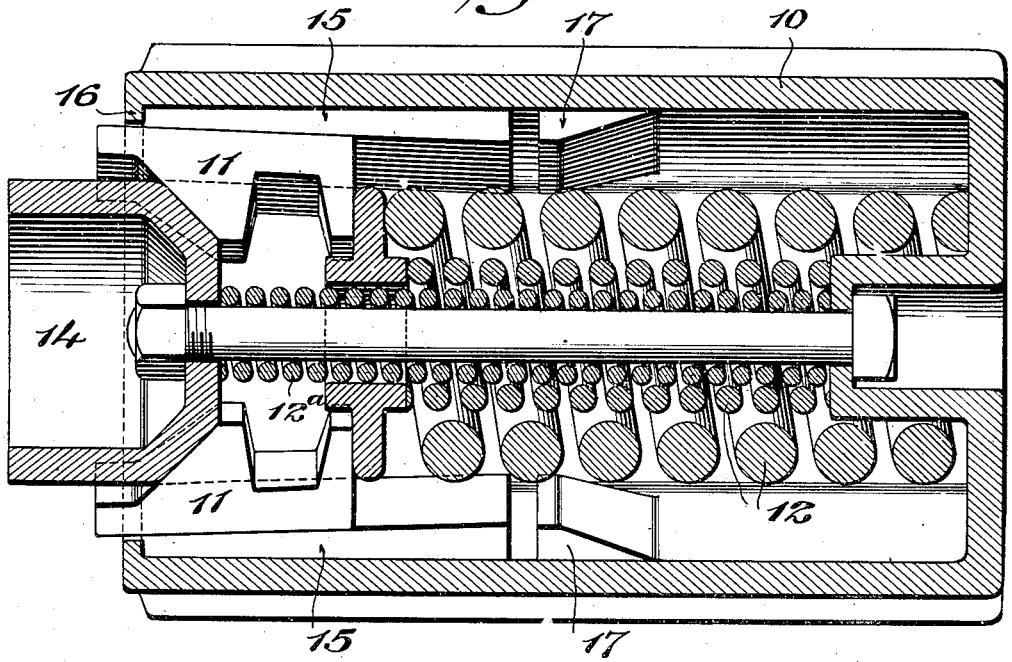
Figure 5 is a view similar to Fig. 1 illustrating an alternative embodiment of the invention.

Referring to the drawings in detail, first with particular reference to Figs. 1 to 4, 10 designates a substantially cylindrical casing open at its front end and closed at its rear end; 11 designate friction shoes disposed in the front end portion of said casing; 12 designates resilient means interposed between the rear ends of said friction shoes and the rear wall 13 of said casing and reacting from said rear wall upon said friction shoes to tend constantly to urge them forwardly relative to said casing; and 14 designates a wedge element for acting rearwardly and outwardly upon the front ends of said friction shoes in response to draft and buffing forces imposed on the gear; 12$^a$ designates resilient means interposed between the rear end of the casing 10 and the wedge element 14 and racting from the rear end of said casing directly forwardly upon said wedge element to assist the resilient means 12 in effecting forward movement of said wedge element and release of the same from the friction shoes 11 independently of the action of the resilient means 12 upon the rear ends of said friction shoes, all as is common and well known in the art.

In draft gears of the type under consideration the friction shoes usually cooperate directly with rearwardly and inwardly inclined interior faces of the casing at the front end thereof. According to the present invention, however, liners 15 are interposed between the friction shoes 11 and the casing 10; the outer faces of said friction shoes are, as usual, inclined rearwardly and inwardly; the inner faces of said liners are inclined rearwardly and inwardly corresponding to the inclination of the outer faces of said friction shoes and are engaged by the said outer faces of said friction shoes, and the outer faces of said liners and the inner faces of the casing which they engage are parallel to the longitudinal axis of said casing. Moreover, the casing 10 is provided with front and rear stop elements 16 and 17, respectively, engageable by the front and rear ends of the liners 15, and said liners are of lesser length than the distance between said stop elements whereby they are capable of limited longitudinal movement relative to the casing 10. Furthermore, the coefficient of friction between the liners 16 and the casing 10 is suitably made as low as possible and, in any event, is lower than the coefficient of friction between said liners and the shoes 11, and coil springs 18 or other suitable resilient means, separate from the resilient means 12, preferably are interposed between the rear ends of the liners 15 and the rear stop elements 17 to tend constantly to urge said liners forwardly relative to the casing 10.

It is understood, of course, that in accordance with common practice in the art, stop means are provided to limit rearward movement of the casing 10 and forward movement of the wedge element 14; that a yoke is associated with the casing 10 for transmitting draft forces forwardly thereto, and that a coupler butt cooperates with the wedge element 14 for transmitting buffing forces rearwardly thereto. Accordingly, either draft or buffing forces imposed on the gear are effective to cause the wedge element 14 to exert force rearwardly and outwardly upon the friction shoes 11 counter to the force exerted forwardly upon said shoes by the resilient means 12.

Accordingly, since normally the liners 15 are held in their forwardmost positions by the springs 18, and since the outer faces of said liners and the interior faces of the casing 10 which they engage are parallel to the axis of the casing 10 and have a low coefficient of friction, at least as compared with the coefficient of friction between the inner faces of said liners and the friction shoes 11, it is apparent that upon the wedge element 14 being subjected to rearwardly directed draft or buffing forces, the shoes 11 and the liners 15 will be moved rearwardly relative to the casing resisted substantially only by the resilient means 12, 12ª and 18 until the rear ends of the liners abut the rear stop elements 17, and that thereafter any further rearward movement of said shoes will be resisted by the frictional cooperation of the same with said liners. Likewise, it is apparent that upon release of draft or buffing forces upon the wedge element 14 and in the event of tendency of the friction shoes 11 to "stick" to the liners 15, said liners, said shoes and said wedge element will be moved forwardly by the resilient means 12, 12ª and 18 until said liners are suddenly stopped by engagement of their front ends with the front stop elements 16, which stopping, combined with the inertia of the wedge element and the force of the resilient means 12ª, will result in loosening of the shoes.

Figure 6:
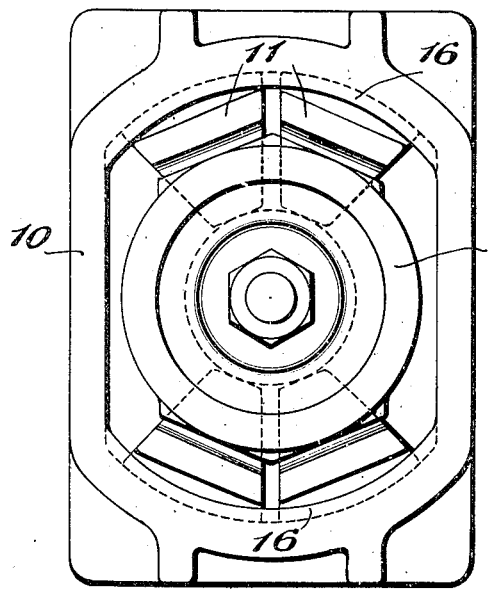
Figure 6 is a front end view of the gear shown in Fig. 5.
Figure 7:
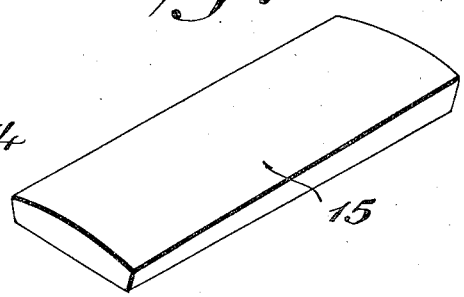
Figure 7 is a perspective view of one of the liners employed in the gear shown in Figs. 5 and 6.

The amount of substantially free rearward movement of the friction shoes 11 relative to the casing 10 may, of course, be variably predetermined by a proper selection of difference in length between said shoes and the space between the stop elements 16 and 17. Moreover, while the springs 18 are illustrated in the present instance as being housed in bores 19 in the stop elements 18 whereby they are retained in operative relationship to the liners 15, it is apparent that said springs, or their equivalents, may be arranged in any other manner to accomplish their function of assuring return of the liners 15 to their forwardmost positions and of maintaining them normally in their forwardmost positions against the stop elements 16 when the gear is relieved of draft or buffing forces. In this connection it will be apparent that the springs 18 are not essential, as the frictional cooperation between the friction shoes 11 and the liners 15 will result in said liners being carried forwardly with said friction shoes whenever, after operation of the gear, the draft or buffing forces imposed thereon are released. Accordingly, Figs. 5 to 7 of the drawings illustrate a construction which is the same as the Figs. 1 to 4 construction, except that it is devoid of springs such as the springs 18.

A novel and advantageous feature of the invention is that the liners 18 have, or may have, bearing throughout the area of their outer faces with the casing 10, and that said casing is in no way weakened by recessing or the like in order to adapt the same to accommodate said liners for limited longitudinal movement relative thereon. On the contrary, the stop elements 16 and 17 serve to reinforce the casing.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A draft gear comprising a casing provided with inwardly extending front and rear spaced apart stop elements, a plurality of friction shoes having downwardly and inwardly inclined outer faces, a wedge element nested within and cooperating with the friction shoes, spring means associated with the shoes and wedge element, a reciprocal metal liner interposed between each shoe and the inner wall of the casing and having an inclined face registering with the inclined face of the shoe, each of said liners being shorter in length than the distance between the said stop elements and movable therebetween and thereagainst, and a positioning spring for each of said liners, the said spring being seated within the casing and arranged to exert a pressure forwardly against the liner with which it is associated.

2. A draft gear as set forth in claim 1 in which the rear stop elements are provided with housing recesses or bores to accommodate and hold the positioning springs for each of the liners.

ROBERT M. NELSON.